Figure 1:
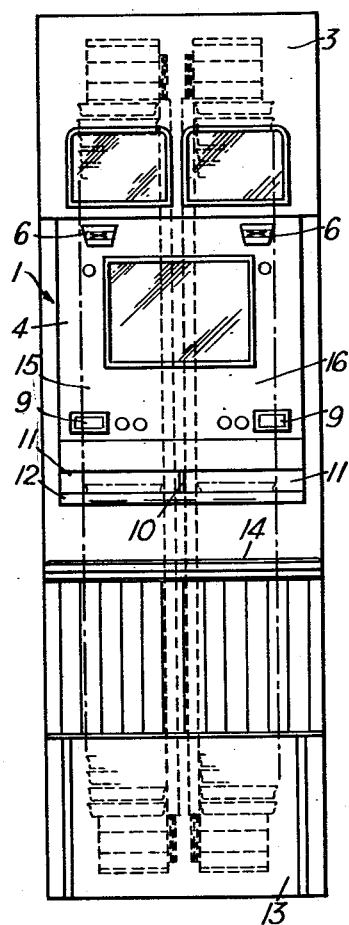

July 30, 1963  M. H. LEWINGTON ETAL  3,099,342
COIN-OPERATED VENDING MACHINES

Filed Sept. 27, 1960  13 Sheets-Sheet 1

Inventor
Micheal Harry Lewington
Alan Thurburn Scott

By [signature]
AGENT

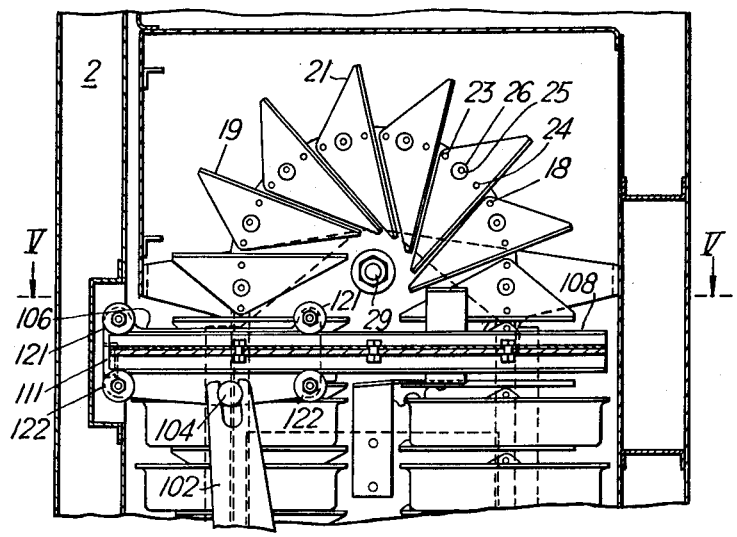
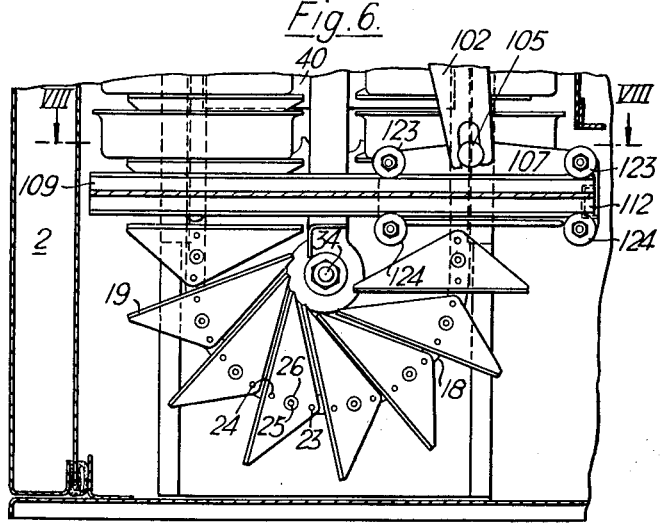

July 30, 1963   M. H. LEWINGTON ETAL   3,099,342
COIN-OPERATED VENDING MACHINES
Filed Sept. 27, 1960   13 Sheets-Sheet 3
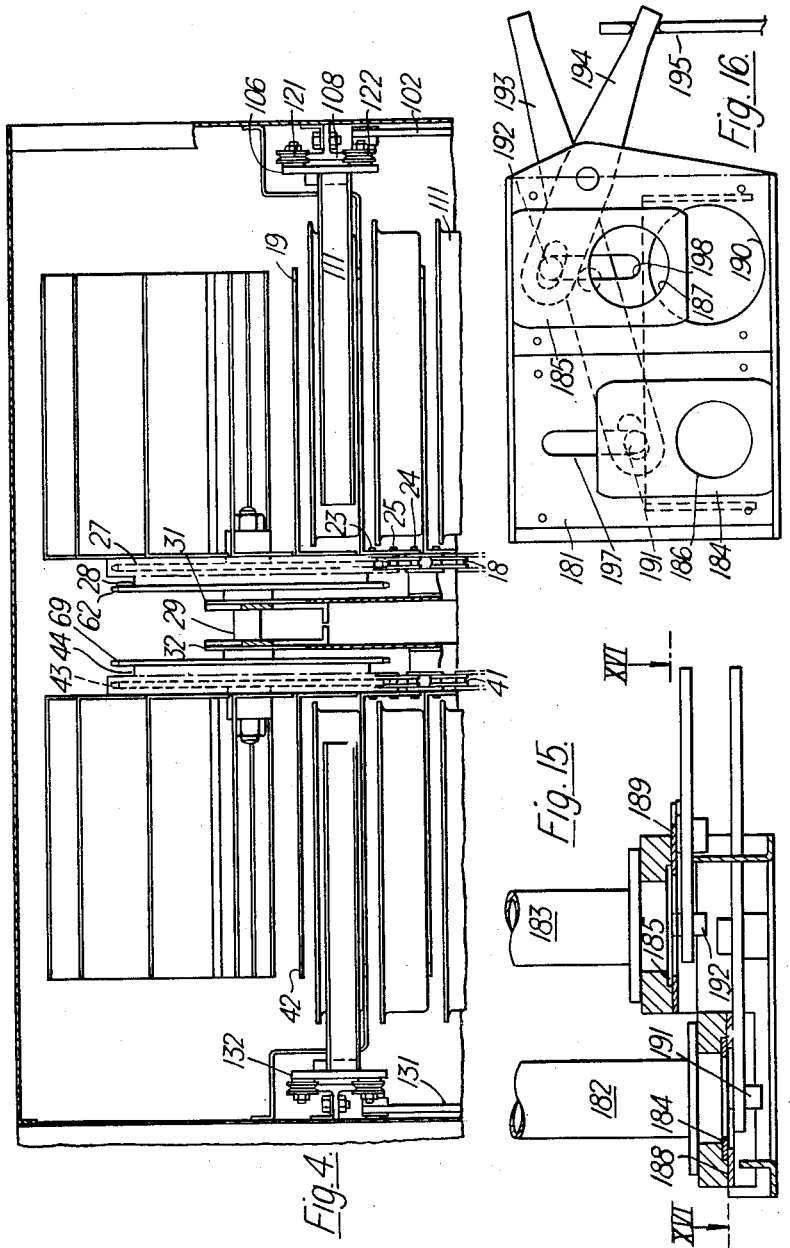
Inventor
Micheal Harry Lewington
Alan Thunburn Scott.
By
AGENT

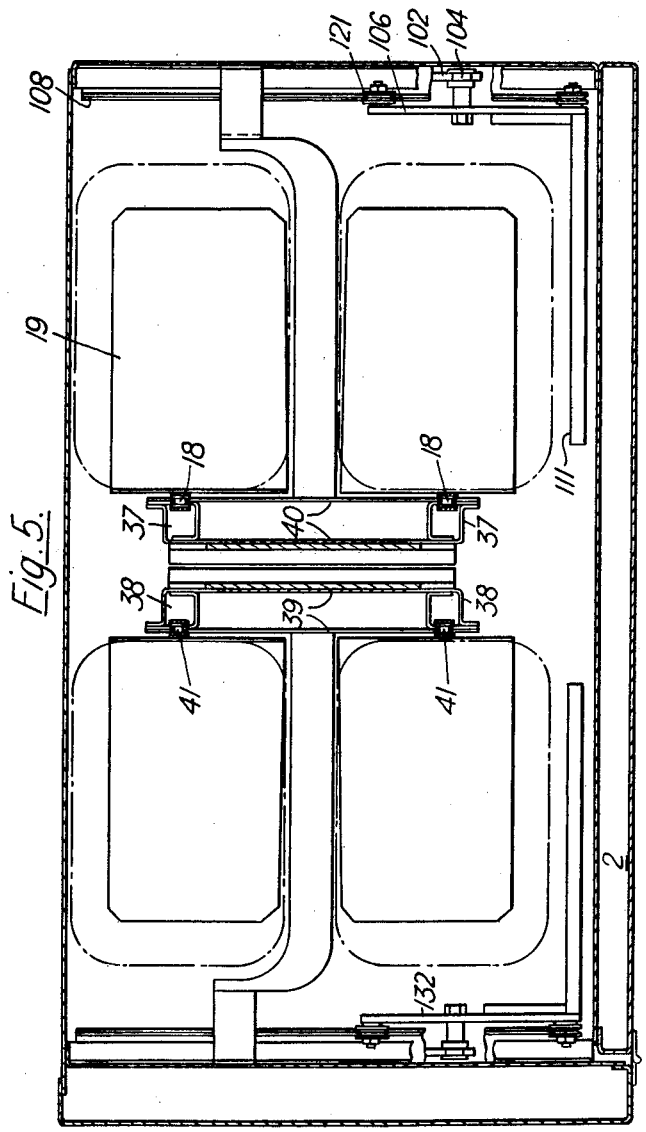

July 30, 1963   M. H. LEWINGTON ETAL   3,099,342
COIN-OPERATED VENDING MACHINES
Filed Sept. 27, 1960   13 Sheets-Sheet 5
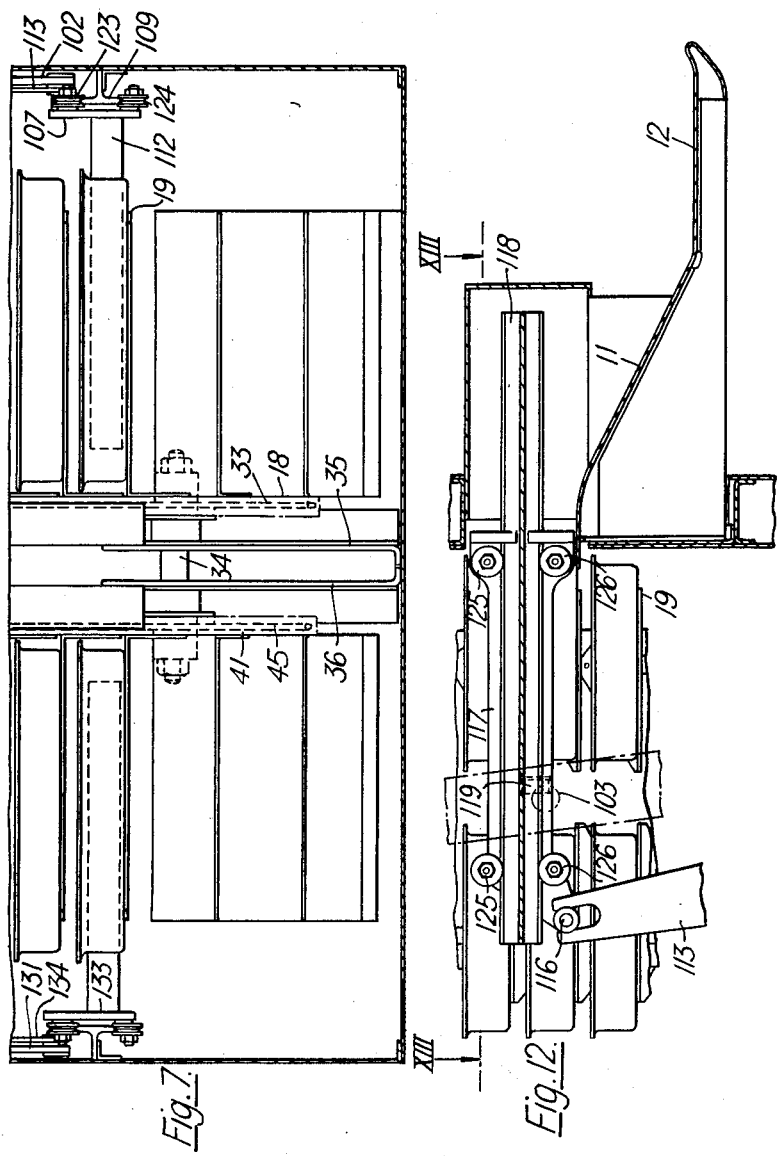
Inventor
Micheal Harry Lewington
Alan Thurburn Scott
By
AGENT

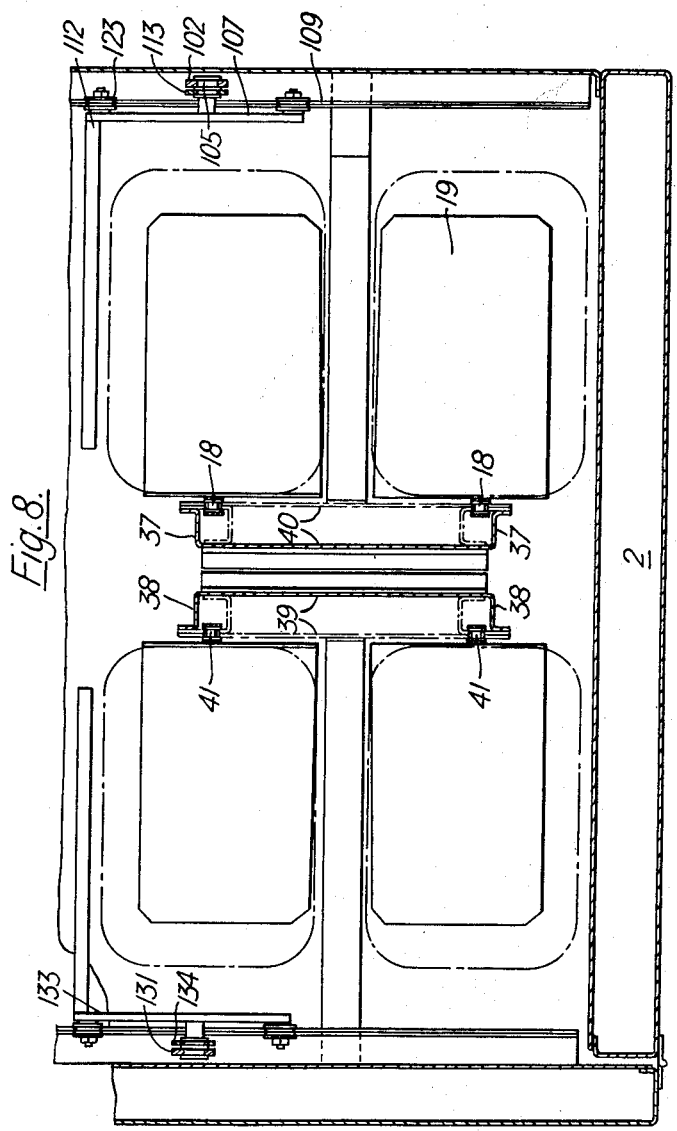

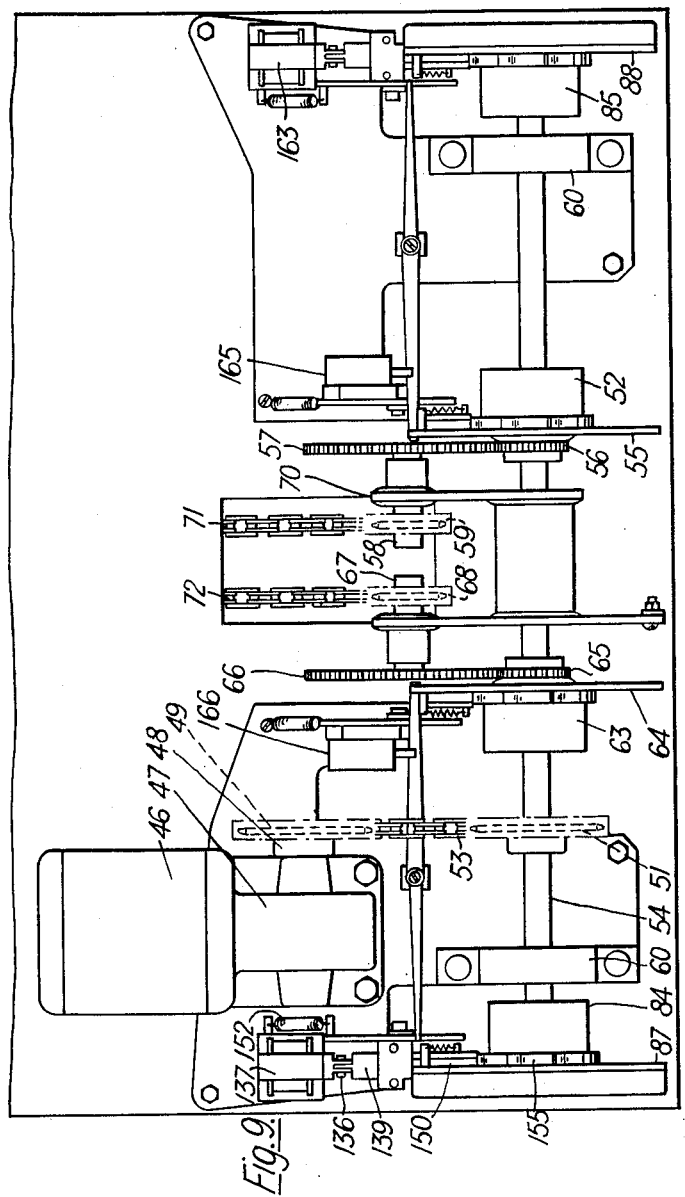

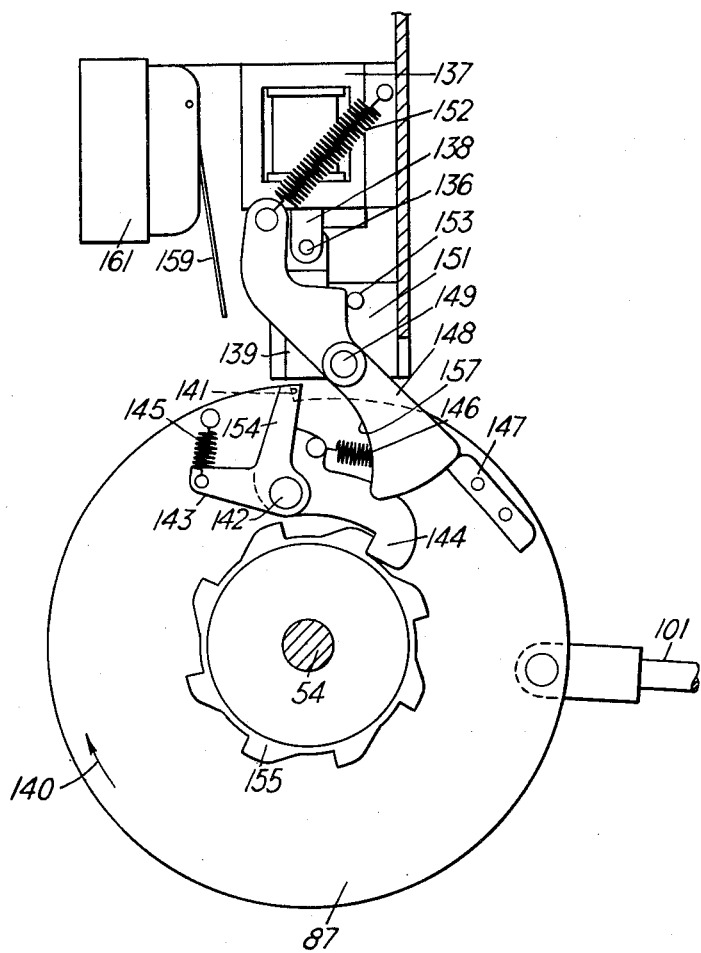

July 30, 1963   M. H. LEWINGTON ETAL   3,099,342
COIN-OPERATED VENDING MACHINES
Filed Sept. 27, 1960   13 Sheets-Sheet 9

Inventor
Micheal Harry Lewington
Alan Thorburn Scott

By
AGENT

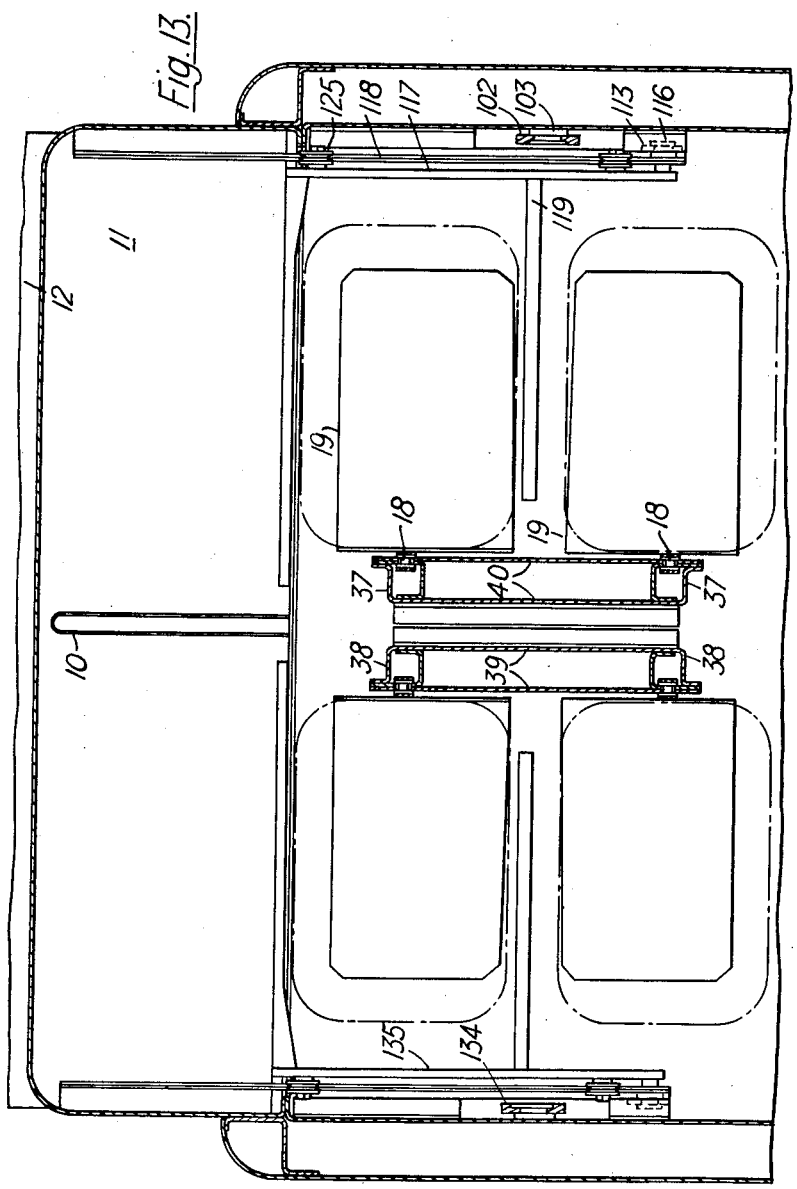

July 30, 1963 M. H. LEWINGTON ETAL 3,099,342
COIN-OPERATED VENDING MACHINES
Filed Sept. 27, 1960 13 Sheets-Sheet 11
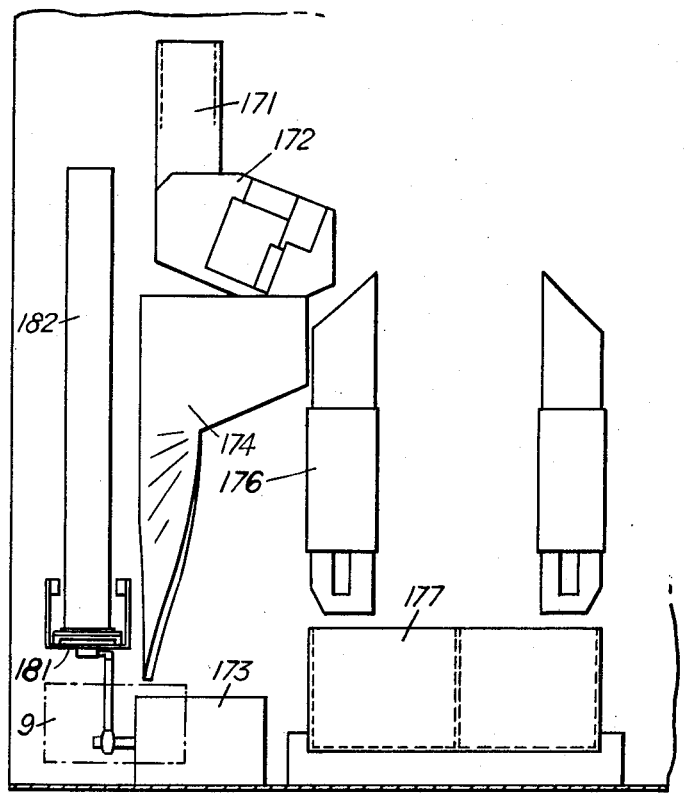
Fig. 14.
Inventor
Micheal Harry Lewington
Alan Thurburn Scott.
By
AGENT

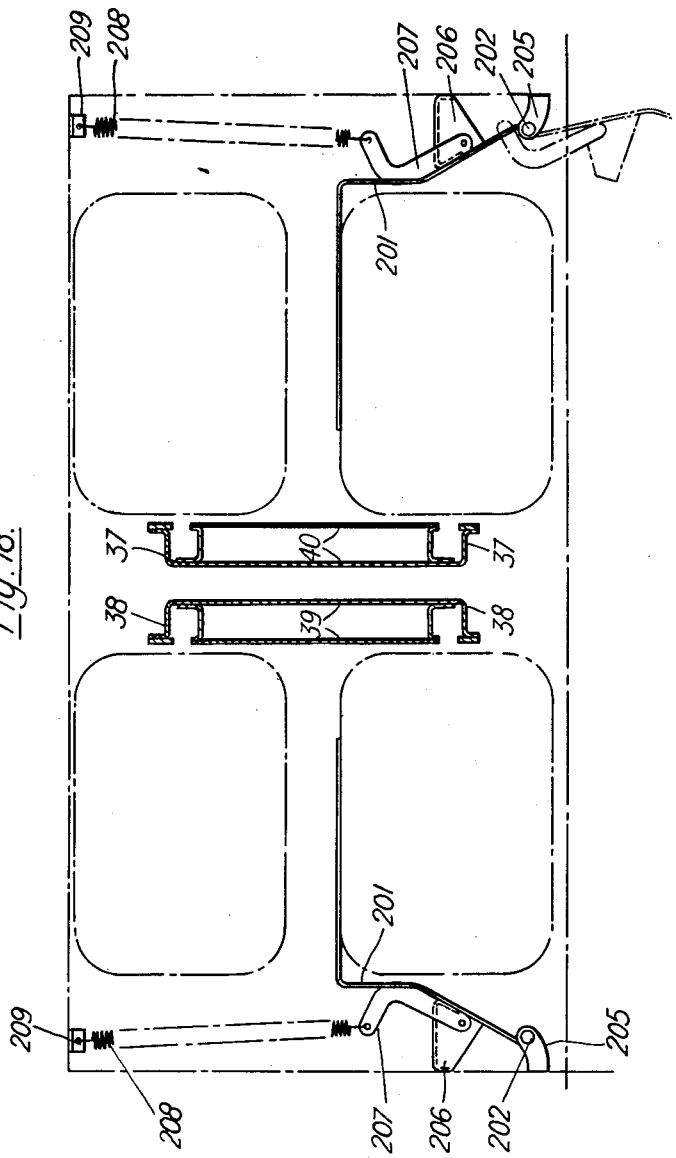

United States Patent Office 3,099,342
Patented July 30, 1963

3,099,342
COIN-OPERATED VENDING MACHINES
Michael H. Lewington, Ruislip, and Alan T. Scott, Englefield Green, England, assignors to Fisher & Ludlow Limited, Tipton, England, a British company
Filed Sept. 27, 1960, Ser. No. 58,734
6 Claims. (Cl. 194—10)

The present invention relates to coin-operated vending machines and is concerned particularly, but not exclusively, with an improved coin-operated vending machine for packaged goods which are kept hot or cool by appropriate heating or refrigerating means embodied in the machine.

One of the main objects of this invention is to provide an improved coin-operated vending machine which is rapid in operation in the sense that there is only a short delay between the insertion of the proper coin or token and the delivery of the goods to the customer.

With this object in view, the improved vending machine according to this invention comprises a coin freed mechanism; an endless conveyor enclosed within an outer casing and having a plurality of goods carrying platforms secured to it at intervals along its length; driving means for advancing the conveyor intermittently to bring successive platforms into position level with the entrance end of a discharge chute leading to a goods receptacle accessible from outside the casing; and an ejector arranged, during each interval between successive advance movements of the conveyor, first to perform a working movement across the platform then situated level with the discharge chute so as to transfer goods from the said platform onto the said discharge chute and thereafter to perform a return movement; the arrangement being such that the passage of a coin or token of a predetermined value through the coin mechanism initiates the working movement of the ejector and that completion of the return movement of the ejector is accompanied by operation of means serving to initiate an advance movement of the conveyor.

The delivery of the product into the goods receptacle thus takes place with a minimum delay after the insertion of an appropriate coin or token and it is only after the goods have been so delivered that the conveyor is advanced to bring the next goods carrying platform level with the inner edge of the discharge chute.

The ejector may be arranged to be moved to and fro by a linkage driven by a one-turn clutch which is engaged by operation of a coin freed mechanism. A solenoid may be provided to operate the one-turn clutch the solenoid being actuated in response to closing of switch contacts, caused, in turn, by the passage of the coin or token through the coin freed mechanism. A change-giving mechanism may also be mechanically connected to the said linkage, so that change can be delivered simultaneously with the delivery of the goods. The driving means for the conveyor may include a further one-turn clutch, the output member of which is drivably connected to the conveyor through reduction gearing, likewise forming part of said driving means, this one-turn clutch being engaged by operation of a solenoid which is actuated in response to closing of switch contacts brought about by the last part of a one-turn rotation of the driven element of the one-turn clutch which drives the linkage.

The goods carrying platforms are preferably secured to a single endless chain passing round upper and lower chain sprockets and having its ascending and descending runs slidably located in vertical guide slots in members which are rigidly connected with supports carrying bearings for the chain sprockets, each platform having a part bent at right angles to its main goods-supporting surface and secured to two link pins of the chain so that the platform projects horizontally from the chain as long as the portion of the chain carrying it is in one of the vertical guide slots.

The linkage is advantageously arranged to operate transfer members located at the upper and lower ends of the straight ascending and descending runs so that they perform working and return movements simultaneously with the working and return movements respectively of the ejector, each working movement of the upper transfer member serving in use to transfer goods from a loaded platform at the top of the ascending run to a previously unloaded platform at the same level on the descending run, and that of the lower transfer member to transfer goods from a loaded platform at the bottom of the descending run to a previously unloaded platform at the same level on the ascending run. This arrangement has the advantage that it enables all the platforms on both straight runs to be loaded initially except the top platform on the descending straight run and the bottom platform on the ascending straight run. The ejector and the transfer members advantageously consist of carriages arranged to travel to and fro along rails and having horizontal pusher bars extending laterally therefrom, while the linkage comprises a long two-armed rocking lever having pin-and-slot connections at its ends with the upper and lower transfer member platforms, a shorter two-armed rocking lever having pin-and-slot connections at its lower end with the lower transfer member platform and at its upper end with the ejector platform, and a connecting rod between the long two-armed lever and the driven member of the linkage actuating one-turn clutch.

Figure 2:
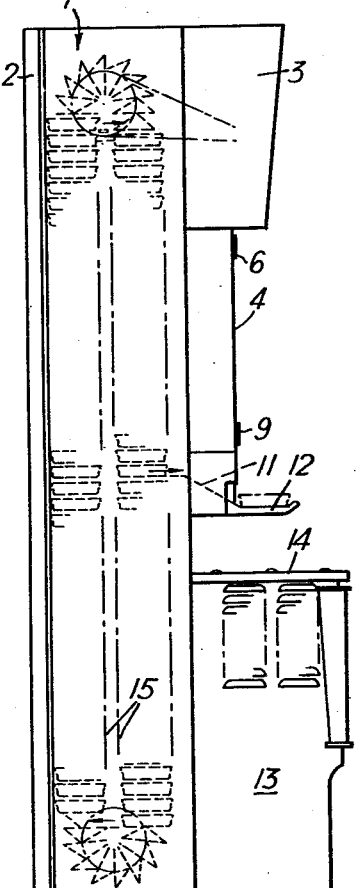
Figure 11:
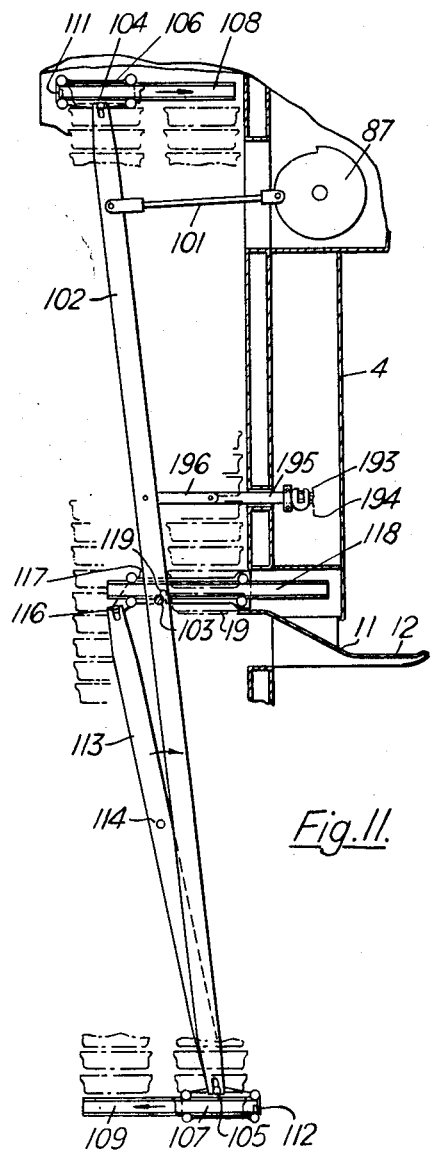
Figure 17:
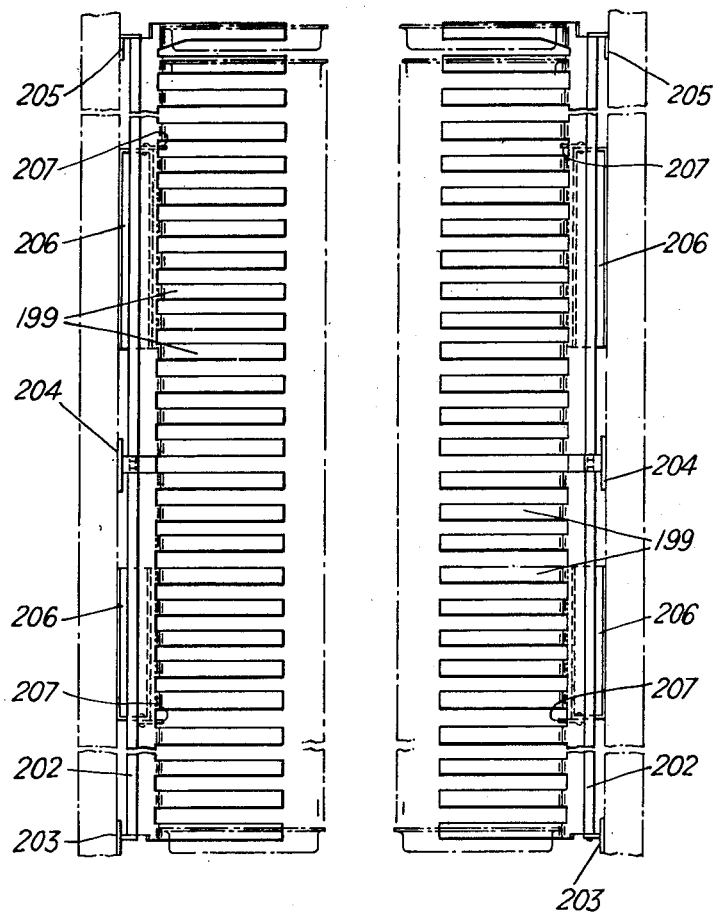

The invention will now be described by way of example with reference to the accompanying drawings, in which:

FIGURE 1 is a general arrangement drawing showing a packaged meal vending machine in front elevation, FIGURE 2 is a drawing showing the same machine in side elevation, FIGURE 3 is a sectional elevation of the upper part of the machine with the side of the casing removed, FIGURE 4 is a vertical section through the upper part of the machine taken in a plane parallel to the front of the machine and as viewed in the direction from the rear towards the front, FIGURE 5 is a horizontal section taken on the line 5—5 in FIGURE 3, FIGURE 6 is a sectional elevation of the lower part of the machine corresponding to FIGURE 3, FIGURE 7 is a vertical section through the lower part of the machine corresponding to FIGURE 4, FIGURE 8 is a horizontal section taken on the line 8—8 in FIGURE 6, FIGURE 9 is a front elevation of the upper part of the machine as seen when the top cover is open and illustrates details of the drive of the machine, FIGURE 10 is an elevation illustrating a one-turn clutch, FIGURE 11 is a side elevation illustrating details of a linkage between the one-turn clutch of FIGURE 10 and three carriages provided with pusher arms, FIGURE 12 is a vertical section corresponding to FIGURES 3 and 6 through part of the machine at an intermediate level, FIGURE 13 is a horizontal section taken on the line 13—13 in FIGURE 12, FIGURE 14 is a front elevation of the centre part of the machine as seen when the centre door thereof is open and illustrates the arrangement of the coin mechanism, FIGURE 15 is a partly sectional elevation illustrating details of a change mechanism, FIGURE 16 is a horizontal section taken on the line 16—16 in FIGURE 15, FIGURE 17 is a rear elevation, partly broken away, illustrating details of a dish-loading stop assembly, FIGURE 18 is a plan view of the dish-loading stop assembly.

Referring to FIGURES 1 and 2, the meal vending machine has a main rectangular cabinet, indicated generally by the reference 1, which contains and supports two side-by-side vertical meal conveyors. At the back of the cabinet 1 is a door 2 through which the conveyors can be loaded. In front of the cabinet 1 at the top is a housing 3 containing a driving mechanism, beneath which is a door 4 enclosing two coin accepting mechanisms arranged side-by-side. Each coin accepting mechanism has a coin slot such as 6 in the front of the casing 4 and a coin tray 9 for delivery to a customer of rejected coins and coins and change.

Below the casing 4 are two chutes 11 arranged side-by-side and leading to a meal tray 12. The two chutes are separated by a partition 10. In front of the bottom part of the cabinet 1 is a casing 13 containing a heating or refrigerating unit, the top 14 of which casing serves as a table on which a stack of hand trays (not shown) or for other purposes and which is placed so as to be conveniently accessible to customers operating the machine.

The positions of the two vertical meal conveyors in the cabinet 1 are indicated in broken lines at 15, 16 in FIGURE 1 and the general arrangement of one of these two conveyors 15 is similarly indicated in broken lines in FIGURE 2. The conveyor 15 consists of an endless chain 18 (FIGURES 3 to 8) and flights 19 attached to this chain at equal intervals throughout its length. The flights 19 have triangular shaped bent portions 21 at one end by which they are each secured to two link pins 23 and 24 of the chain 18. In each case, an intermediate link pin, such as 25 (FIGURES 3 and 6) projects freely through an opening 26 in the bent portion 21.

The chain 18 passes round a toothed ring 27 (FIGURE 4) of a double sprocket 28 freely mounted on a head shaft 29 carried by brackets 35, 36 in the lower part of the machine. The rear ascending and front descending runs of the chain 18 are guided in slots in one wall of vertical chain stacks 37 (FIGURES 5, 8, 13 and 18) forming part of a box section structure 40. Thus, except where it is passing round the sprockets 28 and 33, the chain 18 supports the flights 19 in both the ascending and descending runs horizontally.

Similarly, the conveyor 16, which is opposite hand to the conveyor 15, consists of a chain 41 (FIGURES 4 and 7) carrying flights 42 and passing round a toothed ring 43 (FIGURE 4) of a double sprocket 44 freely mounted on the head shaft 29 and round a sprocket 45 freely mounted on the tail shaft 34.

The chain 41 is guided in slots in vertical chain stacks 38 forming part of a box section structure 39.

The box section structures 39 and 40 extend from the top of the machine to the bottom and are rigidly secured to the brackets 31, 32 for the head shaft bearings and the brackets 35, 36 for the tail shaft bearings, the whole assembly being secured inside the main casing of the machine.

Referring to FIGURE 9, the drive for both conveyor chains 18, 41 is derived from a 1/20 H.P. electric motor 46 provided with a reduction gear 47 through which it drives a shaft 48 at 30 r.p.m. A sprocket 49 on one end of the shaft 48 drives a second sprocket 51 on by means of a chain 53. The sprocket 51 is keyed on a shaft 54 mounted in bearings 60 which thus rotates continuously so long as the motor shaft 48 is rotating. Freely mounted on the shaft 54 is a clutch disk 55 which is fixed for rotation with an 18 tooth pinion 56 meshing with a 54 toothed gear wheel 57 which is mounted on a shaft 58. The clutch disk 55 is provided with means which will be described later for engaging it and disengaging it for rotation with the shaft 54 through the clutchcasing 52. Means, which will also be described later, bring the disk 55 to rest at the end of each complete revolution. Rotation of the gear 57 is thus stopped after each 120° movement. A sprocket 59 on the shaft 58 which is journalled in the bearing 70 drives the second toothed ring 62 of the double sprocket 28 (FIGURE 4) by means of a chain 71. The transmission ratio between the sprocket 59 and the toothed ring 62 is such that the conveyor 15 (FIGURE 1) is advanced by one flight each time the gear 57 completes a 120° partial revolution.

The conveyor 16 is driven is a similar manner from the shaft 54 via a one-turn clutch, the housing 63 of which is fixed for rotation with this shaft 54. The output element of this clutch is a clutch disk 64 which is fixed for rotation with a pinion 65 meshing with a gear wheel 66 mounted on a shaft 67. A sprocket 68 on the shaft 67 drives the second toothed ring 69 of the double sprocket 44 (FIGURE 4) through a chain 72. Means are provided for bringing the clutch disk 64 to rest after each complete revolution, with the result that the gear 66 stops after each 120° rotation. Consequently, the conveyor 16 (FIGURE 1), like the conveyor 15, is advanced one flight at a time.

The electric motor 46 also drives mechanisms associated with each conveyor which operates, before each advance of the conveyor and while the latter is stationary, to transfer a packaged meal forward from the top of the rear ascending run to the top of the front descending run and a further packaged meal rearward from the bottom of the front descending run to the bottom of the rear ascending run, and also to eject yet another packaged meal simultaneously forward from the front descending run onto the chute 11 in front of it, so that it slides down onto the meal tray 12. The drive for this purpose is taken from the same shaft 54 which drives the conveyor (FIGURE 9) on which is mounted the housing 84 of another one-turn clutch. The clutch housing 84 and the housing 85 of a similar one-turn clutch situated at the opposite end of the shaft 54 are both keyed on the shaft. The output element of the clutch having the housing 84 is constituted by a clutch disk 87 which co-operates with means to be described later whereby it is brought to rest after each complete revolution. The output element of the other clutch, i.e. the clutch having the housing 85, is constituted by a similar clutch disk 88.

The clutch disk 87 is coupled by a connecting rod 101 (FIGURES 10 and 11) to the upper part of a long two-armed lever 102 pivoted at 103. The upper and lower ends of this lever 102 are slotted to receive pins 104, 105 projecting laterally from carriages 106, 107 respectively which are slidable to and fro along rails 108, 109. The carriage 106 has a horizontal pusher arm 111 projecting at right angles from its rear end, and the carriage 107 a similar horizontal pusher arm 112 projecting at right angles from its front end (see also FIGURES 3 to 8). The lower end of a shorter two-armed lever 113 pivoted at 114 is also slotted to engage the pin 105 on the lower carriage 107 and the upper end of this lever 113 is slotted to engage a pin 116 on a carriage 117 (FIGURES 12 and 13). This carriage 117 is movable to and fro on a guide rail 118 and carries a horizontal transverse pusher arm 119 which, in the position shown in FIGURE 11, lies behind the meal on the flight 19 which is level with the top of the chute 11.

The top carriage 106 has upper grooved rollers 121 and lower grooved rollers 122 which roll along the top and bottom edges respectively of the guide rail 108. The bottom carriage 107 has corresponding upper and lower grooved rollers 123 and 124; and the intermediate level carriage 117 (FIGURES 12 and 13) has upper and lower grooved rollers 125, 126.

The clutch disk 88 (FIGURE 9) is similarly coupled to a long two-armed lever 131, the upper and lower ends of which are connected by pin-and-slot connections to upper and lower carriages 132 (FIGURES 4, 5) and 133 (FIG- URES 7, 8) respectively. A shorter two-armed lever 134 has its lower end connected to the lower carriage 133, while its upper end is connected to an intermediate carriage 135 (see FIGURE 13). The levers 131, 134 and the carirages 132, 133, 135 are constructed and arranged in a similar manner to the levers 102, 113 and the carriages 106, 107, 117 respectively and the former co-operates with the conveyor 16 just as the latter co-operates with the conveyor 15.

The means already referred to for bringing the clutch disk 87 to rest after one complete revolution are illustrated in FIGURES 9 and 10. Mounted above the disk 87 is a solenoid 137, the armature 138 of which is connected by a pin 136 to a plunger 139. The mechanism now to be described ensures that when this plunger 139 is withdrawn by the solenoid 137 as shown in FIGURE 10 and then released, the disk 87 is caused to rotate and the plunger 139 slides on the spiral outer surface of the disk 87 and finally, after the disk 87 has rotated in the direction of the arrow 140 through 360°, abuts against the face 141 on the disk, thereby bringing the latter to rest. Mounted on a pivot pin 142 on the disk 87 are a bell-crank lever 143 and a pawl 144. The bell-crank lever 143 and the pawl 144 are urged into the positions shown in FIGURE 10 by springs 145 and 146 respectively. A stop bar 147 also mounted on the disk 87 co-operates with a lever 148 pivoted at 149 on a guide 151 for the plunger 139. This lever is urged by a spring 152 towards the position shown in FIGURE 10 in which it engages an abutment screw 153.

The cycle of operations initiated by the momentary energisation of the solenoid 137 is as follows. The plunger 139 is raised from contact with the face 141 and is thus disengaged from the upper arm 154 of the bell-crank lever 143 and from a corresponding arm 150 (FIGURE 9) on the pawl 144. The bell-crank lever 143 thereupon immediately rotates in the clockwise direction as seen in FIGURE 10 into the position shown in which its upper arm 154 is located beneath the lower end of the plunger 139, thereby preventing this plunger 139 from dropping back into the engagement with the face 141 when the supply of electric current to the solenoid 137 is interrupted by the projecting end of the pin 136 striking the actuating arm of a micro switch (not shown). If a gap between two teeth of a ratchet wheel 155 is opposite the nose of the pawl 144, the latter will simultaneously engage this ratchet wheel 155.

If, however, a tooth lies beneath it, the pawl 144 will slide down into the next gap after the ratchet wheel, which is keyed on the shaft 54 has rotated through an appropriate distance. As soon as the pawl 144 is engaged in the ratchet wheel 155, the clutch disk 87 will be rotated together with the shaft 54 and ratchet wheel in the direction of the arrow 140. The lower end of the plunger 139 now slides off the top of the lever arm 154 onto the spiral circumference of the disk 87 which allows it to descend gradually. In due course, the stop bar 147 on the disk 87 engages the curved edge 157 of the lever 148 which is consequently rocked anticlockwise as seen in FIGURE 10 against the action of its spring 152 until its upper arm 158 engages an actuating arm 159 to close the contacts of a micro-switch 161. As soon as the stop bar 147 rides past the end of the curved surface 157, the lever 148 is returned by its spring 152 into engagement with the abutment screw 153. Shortly before the disk 87 has completed one revolution, the arm 154 of the bell crank lever 143 and the arm 150 on the pawl 144 will strike against the plunger 139 and will thus be rocked anti-clockwise as seen in FIGURE 10. The consequent rotation of the pawl 144 causes its nose to become disengaged from the ratchet wheel 155 to interrupt the drive to the clutch disk 87 which is thereupon positively brought to rest by the plunger 139 dropping into contact with the face 141. Any possibility of reverse rotation of the disk 87 before the plunger 139 is engaged in the recess 141 is now prevented by virtue of the fact that the stop bar 147 is opposite the end of the lever 148.

During this cycle of operations, the connecting rod 101, connected between the clutch disk 87 and the long lever 102, will impart a working movement and a return movement to the carriages 106, 107 and 117.

The clutch 85, 88 has associated with it a solenoid 163 and a micro switch (not shown) corresponding respectively to the solenoid 137 and micro switch of the clutch 84, 87 and these two clutches and their associated mechanisms are generally similar.

The two other one-turn clutches 52, 55 and 63, 64 in the conveyor drives also have corresponding solenoids 165 and 166 respectively. Each of them likewise is associated with a micro switch. The construction and operation of these two clutches differ from those of the clutch 84, 87 in little except that their clutch disks, instead of being coupled to connecting rods, are drivably connected with the pinions 56 and 65 respectively for the respective conveyor drives.

Referring to FIGURE 14, which illustrates details of the coin mechanism for the conveyor 15, a coin chute 171 leads from the coin slot 6, which is shown in FIGURE 1, to a coin selector 172 which checks each coin for size, weight, magnetism and other characteristics. From this coin selector 172, each coin, if rejected by the selector 172 are discharged onto a chute 174 or deflector plate leading to a coin tray 9 which is accessible from outside the cabinet as shown in FIGURE 1. Any coin selected by the coin selector 172 will be discharged through a chute 176 into a cash box 177. On leaving the coin chute 176, the coin operates an actuating arm to close the contacts of a micro switch which is conveniently situated.

Alongside the coin selector 172, and directly above the coin tray 9 is arranged a change-giving mechanism having a base 181 and coin stacks 182, 183 one behind the other. Within the base 181 of this change-giving mechanism are two sliding plates 184, 185 (FIGURES 15 and 16). The sliding plates 184, 185 are formed with coin apertures 186, 187 the latter being in the withdrawn position (see FIGURE 16) and in register with the corresponding coin stack 183 and the former being in the forward position (see FIGURE 16) and in register with corresponding openings, such as 190 in base plates 188 and 189 respectively. The plates 184, 185 have depending pins 191, 192 which project through slots 197, 198 in the base plates 188, 189 and engage respectively in the slotted inner ends of the two levers 193, 194.

Thus, each time either slide 184 or 185 is moved from its withdrawn position to its forward position it discharges one coin from the bottom of the corresponding stack into the coin tray 9 (FIGURE 14). While the levers 193, 194 are shown for convenience in FIGURE 16 in opposite end positions, they will normally lie one above the other with their outer ends engaged in a vertical slot in the end of a bar 195 (FIGURE 11) connected by a link 196 to the lever 102. Thus, each time the lever 102 is rocked to and fro coins from the coin stacks 182 and 183 will be discharged into the coin tray 9.

Mechanisms corresponding to those described above with reference to FIGURES 14 to 16 are also provided for operation in conjunction with the second conveyor 16.

The machine is loaded through the rear door 2, the front flights being loaded first and the rear flights afterwards. As shown in FIGURE 11, the front flight level with the pusher bar 112 is loaded while the rear flight at this level is left empty, and the rear flight level with the pusher bar 111 is loaded and the front flight at this level is left empty. To facilitate the loading of the rear flights of the conveyors, dish-loading stops are provided as shown in FIGURES 17 and 18. These dish-loading stops are constituted by fingers 199 on angled metal strips 201 pivoted on vertical rods 202 carried by brackets 203, 204, 205. The metal strips are in two sets one for the lower half of the machine, i.e. below the brackets 204, and one for the upper half of the machine, i.e., above the brackets 204. Brackets 206 serve as abutments to locate the dish-loading stops in position for the loading of the flights in the rear ascending runs of the conveyors. Bent arms 207 are connected between the strips 201 and one end of tension springs 208 the other ends of which are anchored to the front of the cabinet at 209. The bent arms 207 are so arranged that, when the dish loading stops are swung rearwardly through nearly 180°, the inner surfaces of their angled parts engage partly round the vertical rods 202 and the dish-loading stops having moved over centre are yieldingly held in their swung back positions.

The machine, having been duly loaded and connected to a suitable source of electric current, operates as follows when an appropriate coin is inserted in the coin slot 6. This coin, having been selected by the coin selectors 172 (FIGURE 14), passes out through the chute 176 and in so doing operates the micro switch situated therein which initiates the whole sequence of operations involved in dispensing a meal to the customer and delivering the appropriate change to him.

After passing the micro switch in the chute 176 the coin drops into the cash box 177. Any coin inserted after the insertion of a first coin before the cycle of operations of the machine has been completed will be returned to the customer, electrical switch means being provided to accomplish this. The operation of the coin chute micro switch in addition to operating a counter mechanism 173 energises the solenoid 137 (FIGURE 10), thereby raising the plunger 139 with the result that the clutch disk 87 is rotated through 360° as previously described. The solenoid 137 is only energised for a very short time, since the pin 136 on the plunger 139, rising with the latter, effects the closing of the contacts of the micro-switch associated therewith to interrupt the supply circuit of this solenoid. At the end of its 360° rotation the disk 87 is declutched from the shaft 86 and locked by the plunger 139.

The rotation of the disk 87 imparts a reciprocating movement to the connecting rod 101 which in turn rocks the lever 102 first clockwise as seen in FIGURE 11 and then anticlockwise. The clockwise movement of the lever 102 causes the carriage 106 to move forward and the carriage 107 to move rearwardly. Thus, the pusher arm 111 will transfer a meal from the rear flight at its own level to the corresponding front flight of the conveyor (see FIGURE 11); and the pusher arm 112 will similarly transfer the meal from the front flight at its own level to the corresponding rear flight. Since the lever 113 is coupled to the lever 102 by the pin 105, this lever will also perform a similar to-and-fro rocking movement. The first part of this rocking movement advances the carriage 117 so that its pusher arm 119 causes the meal in front of it to slide off the corresponding flight onto the chute 11 down which it slides onto the meal tray 12.

After the levers 102, 113 have rocked back so that the pushers 111, 112 and 119 are clear of the conveyor flights and shortly before the drive to the clutch disk 87 is interrupted, the stop bar 147 rocks the lever 148 so that the upper arm 158 thereof engages the actuating arm 159 to close the contacts of the micro switch before mentioned. The conveyor is then moved by a distance of one flight.

Energisation of the solenoid 165 engages the drive between the clutch housing 52 and the clutch disk 55 from which the drive is transmitted via the pinion 56, gear wheel 57, sprocket 59, chain 71 and toothed ring 62 of the double sprocket 28 on the head shaft 29. It will be recalled that the chain 18 of the conveyor passes round the other toothed ring 27 of the double sprocket 28.

The sequence of operations of the one-turn clutch 52, 55 is the same as that of the one-turn clutch 84, 87, except that having no micro-switch corresponding to that of the clutch 84, 87 it does not close the contacts of any such switch; and, shortly before the clutch disk 55 is brought to rest and locked, a stop bar (not shown) on the clutch disk 55 rocks a lever (not shown) corresponding to the lever 148 of the clutch 84, 87, which engages and displaces the actuating arm of an associated micro-switch on its return stroke, so that the contacts thereof are closed. The supply of electric current to the electric motor 46 is cut off in response to this micro switch. This completes the cycle of operations which will be repeated on insertion of a new coin.

The cycle of operations performed when a coin is inserted in the coin slot associated with the conveyor 16 is similar to that described above for the conveyor 15. In this case, the clutch 85, 88 operates to effect the discharge of a meal onto the corresponding meal tray 12 and to transfer meals from the ascending run of the conveyor to the descending run at the top and from the descending run to the ascending run at the bottom; and the clutch 63, 64 operates subsequently to advance the conveyor by one flight.

What we then claim is:
1. In a vending machine, in combination:
   (a) a support;
   (b) endless conveyor means movable on said support, said conveyor means having two straight vertically extending runs, a top portion, and a bottom portion, said portions connecting said runs, whereby one of said runs ascends and the other descends during movement of said conveyor;
   (c) a plurality of goods carrying platform means secured to said conveyor means and uniformly spaced thereon in the direction of the movement thereof;
   (d) discharge chute means arranged on said support adjacent a portion of one of said vertical runs spaced from said top and bottom portions, said portion of said one vertical run and said chute means defining a discharge station;
   (e) ejector means movable on said support at said station transversely of said one vertical run for ejecting goods from a platform means located at said station into said discharge chute means;
   (f) two transfer means respectively movable on said support adjacent said top and bottom portions transversely of said runs for transferring goods from a platform means at the top of the ascending run to a platform means at the top of the descending run, and for transferring goods from a platform means at the bottom of the descending run to a platform means at the bottom of the ascending run;
   (g) motion transmitting means connecting said ejector means and said two transfer means for joint ejecting and transferring movement; and
   (h) motion initiating means responsive to completion of said joint movement for initiating movement of said conveyor means over a distance corresponding to the spacing of said platform means on said conveyor means.

2. In a vending machine as set forth in claim 1, actuating means for actuating said joint movement of said ejector means and of said transfer means, said actuating means including continuously rotating drive means, clutch means engageable for selectively connecting said motion transmitting means to said drive means during rotation of said drive means through a predetermined angle of rotation, and coin operated means for engaging said clutch means.

3. In a vending machine as set forth in claim 2, said coin operated means including means defining the path of an inserted coin, solenoid means actuable to engage said clutch means, said solenoid means being responsive to insertion of a coin in said path for engaging said clutch means.

4. In a vending machine as set forth in claim 2, said ejector means and said transfer means each including a carriage member movable in a horizontally extending direction, rail means mounted on said support for guiding the movement of the carriage member, and a pusher bar extending from the carriage member in the direction of movement thereof; and said motion transmitting means including lever means pivoted on said support and hingedly connected to the carriage members of said two transfer means for simultaneous movement of said members in opposite directions, and linkage means connecting said lever means to the carriage member of said ejector means and to said clutch means for reciprocating movement of said carriage members on the respective rail means during movement of said drive means through said predetermined angle of rotation.

5. In a vending machine as set forth in claim 2, said motion initiating means including additional clutch means engageable for selectively connecting said conveyor to said drive means during rotation of said drive means through a predetermined angle of rotation, and means responsive to the disengagement of said first named clutch means for engaging said additional clutch means.

6. In a vending machine as set forth in claim 1, each platform means including a platform member, and guide means for aligning said platform member with the direction of movement of said ejector means and of said transfer means when said platform means moves on the vertically extending runs of said conveyor means.

References Cited in the file of this patent

UNITED STATES PATENTS

| | | |
|---|---|---|
| 1,946,078 | Kelley | Feb. 6, 1934 |
| 2,274,842 | McCann | Mar. 3, 1942 |
| 2,285,435 | Holcomb | June 9, 1942 |

FOREIGN PATENTS

| | | |
|---|---|---|
| 330,525 | Great Britain | June 10, 1930 |